United States Patent [19]

Beck

[11] 4,324,226
[45] Apr. 13, 1982

[54] SOLAR ENERGY APPARATUS

[76] Inventor: James A. Beck, 3530 St. Johns Ave., Billings, Mont. 59102

[21] Appl. No.: 147,937

[22] Filed: May 8, 1980

[51] Int. Cl.³ .............................................. F24J 3/02
[52] U.S. Cl. .................................. 126/429; 126/430; 126/436; 126/442; 126/450
[58] Field of Search ............... 126/417, 419, 428, 429, 126/424, 425, DIG. 1, 430, 442, 448, 436, 450

[56] References Cited

U.S. PATENT DOCUMENTS

| 2,182,222 | 12/1939 | Courtis et al. | 126/424 |
| 2,857,634 | 10/1958 | Garbade et al. | 126/419 |
| 2,902,028 | 9/1959 | Manly | 126/424 |
| 3,012,294 | 12/1961 | Waldor | 126/429 |
| 4,002,159 | 1/1977 | Angilletta | 126/429 |
| 4,095,369 | 6/1978 | Posnansky et al. | 126/438 |
| 4,100,914 | 7/1978 | Williams | 126/429 |
| 4,149,523 | 4/1979 | Boy-Marcotte et al. | 126/425 |
| 4,205,661 | 6/1980 | Chapman | 126/425 |
| 4,212,289 | 7/1980 | Hebert | 126/428 |

Primary Examiner—Daniel J. O'Connor
Attorney, Agent, or Firm—Arthur L. Urban

[57] ABSTRACT

Apparatus for absorbing solar energy including a plurality of energy absorbing members, said energy absorbing members being arranged substantially parallel to and closely adjacent to each other in a row, each energy absorbing member including a mass of solar energy absorbing material extending substantially to the edges thereof, insulating material disposed on one side of the energy absorbing material, sealing members disposed between adjacent energy absorbing members, mechanism for moving the energy absorbing members from an energy absorbing position to an energy radiating position.

3 Claims, 6 Drawing Figures

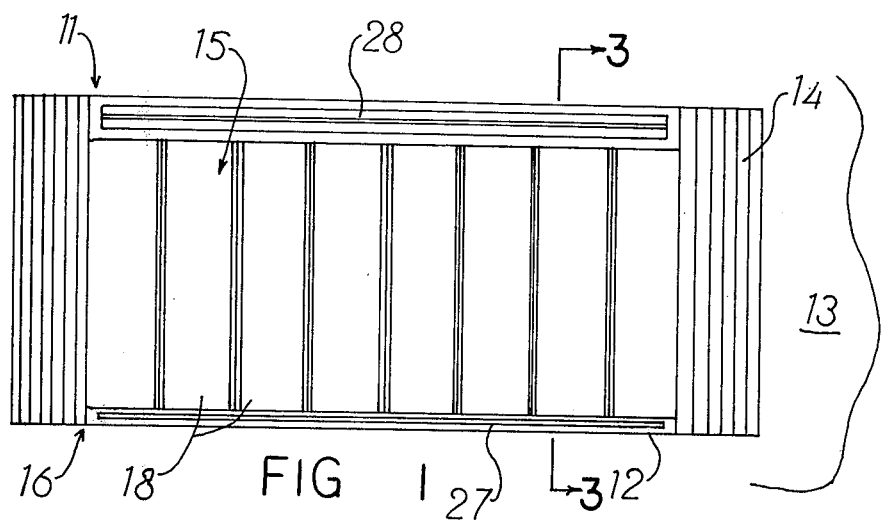
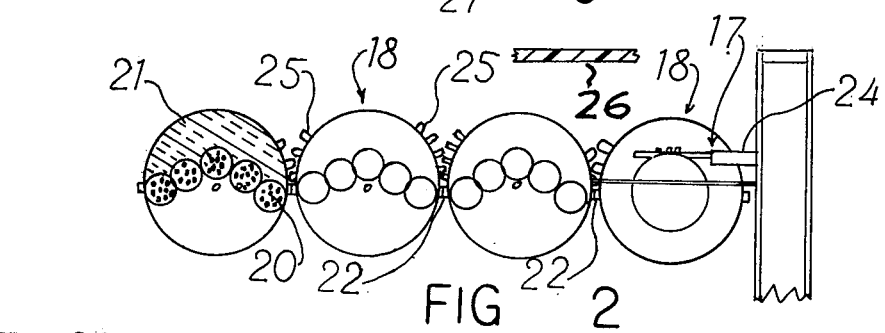
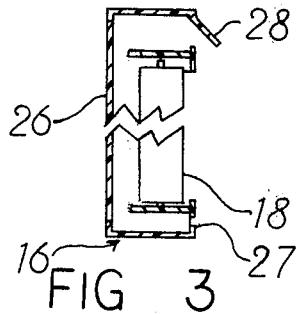
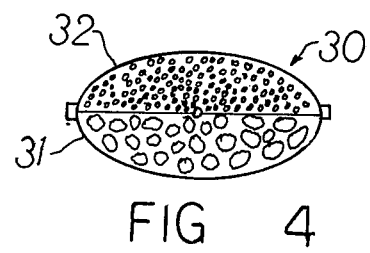
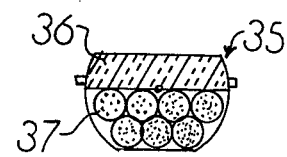
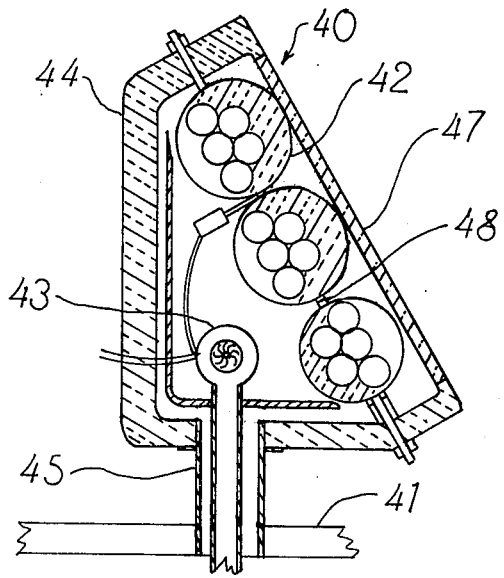

SOLAR ENERGY APPARATUS

This invention relates to a novel solar energy apparatus and more particularly relates to a new apparatus for absorbing and storing solar energy.

With the recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heat fluid is stored. Also, the fluid is circulated through a heat absorbing material, such as a bed or rocks which will absorb and store the heat energy for future recovery.

Since solar energy itself is free, the principal costs of solar energy systems are the initial expenditure for the solar energy converting equipment and the subsequent expense of operating and maintaining the equipment. The initial costs of the solar system generally are quite high since the systems ordinarily are designed specifically for a particular building.

Even when standard components are utilized in a system, the problems in installing the components in a specific building involve considerable time and labor both in design and building modification. For example, the solar collectors have to be located for maximum efficiency. This ordinarily requires that the collectors be positioned on the roof of the building or on vacant ground adjacent to the building. Also, some type of storage chamber has to be constructed either within the building itself or again on vacant ground adjacent to the building. In addition, means must be provided to transfer the heated fluid from the collectors to the storage.

In many cases, the costs for designing a system and installing same exceed the cost of the components themselves. Because of the high cost of installing solar energy systems in existing buildings, the utilization of solar energy systems almost exclusively has been in new buildings where a system can be installed with a minimum of modification of the building.

The present invention provides a novel solar energy apparatus which is readily adaptable for use in existing buildings. The solar energy apparatus of the invention can be installed in existing buildings with a minimum of structural modification. Also, the apparatus of the invention is self-contained, that is, the apparatus serves both as a solar energy absorber and as a storage chamber. Thus, a separate storage chamber does not have to be constructed.

The solar energy apparatus of the invention is simple in design and relatively inexpensive to manufacture. Furthermore, the apparatus can be installed in a relatively short time. Since the solar apparatus can be installed in existing openings of buildings such as window openings, the installation may be accomplished by a homeowner with limited carpentry skills. Also, the solar energy apparatus of the invention can be fabricated from commercially available materials utilizing conventional techniques with semi-skilled labor. In addition, the apparatus can be installed in new construction in planned openings and even on the outside of buildings adjacent to window with advantage.

Other benefits and advantages of the novel solar energy apparatus of the present invention will be apparent from the following description and the accompanying drawings in which:

FIG. 1 is a side elevation of one form of the novel solar energy absorbing and storage apparatus of the invention;

FIG. 2 is a fragmentary top view in section of the solar energy apparatus shown in FIG. 1;

FIG. 3 is a sectional view taken along line 3—3 of FIG. 1;

FIG. 4 is a top view in section of another form of a solar energy absorbing member of the apparatus of the invention;

FIG. 5 is a top view in section of a further form of a solar energy absorbing member of the apparatus of the invention; and FIG. 6 is a side view in section of another form of the solar energy absorbing and storage apparatus of the invention.

As shown in FIGS. 1-3 of the drawings, one form of the novel solar energy absorbing and storing apparatus 11 of the invention is mounted in an opening 12 formed in a wall 13 of a building. The apparatus may have dimensions similar to that of a window. Thus, the apparatus can replace a window in an existing building or can be mounted in a window size opening in a building under construction. The apparatus of the invention also can be mounted in another surface of a building such as the roof, if desired. Traversing drapery 14 may be hung adjacent to the apparatus 11 to cover same when desired to control radiating heat.

The solar energy absorbing and storing apparatus 11 includes an energy absorbing section 15. The energy absorbing section 15 includes a plurality of energy absorbing members 18. The energy absorbing members 18 are arranged substantially parallel to and closely adjacent to each other in a row, preferably in substantially a single plane. Advantageously, the energy absorbing members 18 are rotatably mounted in a support section 16.

As shown, each solar energy absorbing member 18 includes a mass of solar energy absorbing material 20 which extends substantially to the edges of the member. Advantageously, the energy absorbing material is disposed within at least one absorbing envelope. Preferably, the energy absorbing members 18 as shown are cylindrical in configuration. As shown, the energy absorbing material may be contained in a plurality of elongated tubes, each of which contains a suitable energy absorbing material.

A variety of energy absorbing materials such as fluids e.g. water or other liquids and solids e.g. rocks, pebbles and other granular material may be employed. Especially useful are phase change materials, that is, materials which change from liquids to solids in the normal range of temperatures that would be encountered by the apparatus. Suitable phase change materials include salts such as Glauber's salt, calcium chloride hexaydrate and similar materials. One such material is sold in tubular form by Pipe Systems Incorporated as THERMOL 81 Energy Storage Rods.

An insulating material 21 is disposed on one side of the energy absorbing material 20. Suitable insulating materials include those commercially available in foam, batt or granular form such as fiberglass, cellulose, plastics e.g. polystyrene and the like. Sealing means such as rubber strips 22 are disposed between adjacent energy absorbing members 18 and between the members and the support to reduce air leakage around and through the components of the assembly.

Means are provided for moving the energy absorbing members 18 from an energy absorbing position to an energy radiating position as will be explained hereinafter. As shown, moving means 17 may include an electric motor 24 operatively connected to one or more of the energy absorbing members 18. The motor 24 effects rotation of the member on its axis. To provide rotation of the other energy absorbing members 18, the members may be interconnected so that rotation of one member driven by the motor will produce rotation of the other members. For example, a plurality of gear teeth 25 may be disposed around the periphery of the members, preferably adjacent one or both ends thereof. These gear teeth 25 mesh with teeth on adjacent members so that when one is rotated, the adjacent members also will be rotated. Other means for effecting movement of the members 18 may include combinations of chains and sprockets, pulleys and belts and the like (none of which are shown).

Support section 16 carries the energy absorbing members 18 and maintains them in position with respect to one another. The energy absorbing members 18 preferably are mounted for rotation within the support section 16. Advantageously, the support section 16 includes frame means which retain the members 18 within a unitary assembly.

The outside of the apparatus 11 of the invention may include a glazed area 26, that is, a pane or panes of glass or plastic. This glazed area protects the working parts of the apparatus from the elements and provides a buffer zone of air. Also, glazed area provides security. Preferably, as shown in FIG. 3, means are provided for circulating air through the buffer zone between the glazed area and the energy absorbing members 18. These means may include a fan if desired or as shown simply a cool air inlet 27 near the bottom of the apparatus and a warm air outlet 28 adjacent the upper part of the apparatus. With the latter construction, there will be a natural circulation of air as it is heated within the buffer zone.

FIG. 4 illustrates another form of energy absorbing member 30, including a substantially flat envelope 31 containing energy absorbing material such as a plurality of rocks and a similar envelope 32 of insulating material, e.g. fine granules. The two envelopes 31 and 32 together form an elongated, oval energy collecting member 30.

FIG. 5 illustrates a different form of energy absorbing member 35 in which a slab of foamed insulation 36 is combined with a double row of tubes 37 containing a phase change material such as a phase change salt material.

Energy absorbing and storing apparatus of the invention also may be utilized as shown in FIG. 6. Apparatus 40 may be mounted on a roof 41 of a building such as a mobile home with a plurality of energy absorbing members 42 mounted horizontally. A fan 43 is located in a housing 44 behind the energy absorbing members 42. The apparatus is mounted on the roof with means including a hollow conduit 45 so that air may be circulated from the housing 44 down into the building through the conduit. The apparatus 40 also includes a glazed area 47 and sealing means 48 to improve the efficiency of the operation of the apparatus.

In the operation of the energy absorbing and storage apparatus shown in FIGS. 1-3, the assembly is mounted in an opening 12 of a wall 13 of a building. The unit is self-contained and can be mounted easily in a window opening. The glazed area 26 faces outwardly from the building. In use, when the sun is shining, the motor 24 is actuated to rotate the adjacent energy absorbing member 18 to a position so that the energy absorbing material 20 thereof is facing outwardly. Since adjacent members are interconnected through gear teeth 25, all of the members along the row also will be rotated to the same position. The energy absorbing material is heated while the sun shines on it throughout the day.

As evening approaches and the sun sets, the motor 24 is again actuated, rotating members 18. The members 18 will be rotated to a position in which the energy absorbing material 20 of each member will face into the building. In this position, the insulating material 21 will face the outside.

With the heated energy absorbing material 20 facing into the building, it will radiate the heat into the building causing the temperature of the building to rise. The members 18 remain in this radiating position until the sun rises again. Then, the members 18 can be rotated to face the outside, that is, to their energy absorbing position and the cycle repeated.

If desired, the members can be rotated to a neutral position half way between the two positions described. In this neutral position, some light will pass between the members to illuminate the building. The apparatus of the invention also may be used to cool a building by reversing the heating cycle. In this situation, the energy absorbing material would face into the building during the heat of the day and be turned to the outside at night. During the night, the energy absorbing material would be cooled by the night air. In the morning, the cooled energy absorbing material would be turned to the interior of the building to provide a cooling effect for the building.

The apparatus 40 shown in FIG. 6, is installed by positioning the unit on a roof 41 of a building with the conduit 45 extending into the building. The energy absorbing members are turned toward the sun and absorb heat therefrom. At night, members 42 are turned into the housing 44. Heat is withdrawn from the members by circulating air with fan 43 from the building through the housing 44 and via conduit 45 back into the building. The unit also may be used for cooling as described above.

The above description and the accompanying drawings show that the present invention provides a novel solar energy apparatus which both absorbs solar energy and stores it until it is needed. The apparatus of the invention is a self-contained unitary structure, and thus separate absorbing and storage units are not required. These features of the apparatus simplify installation in existing buildings and minimize the necessity for changes in the structure of the building. Furthermore, the installation can be done by individuals with limited carpentry skills that are familiar with the installation of windows.

The solar energy apparatus of the invention is simple in design and can be fabricated from commercially available materials utilizing conventional manufacturing techniques. The apparatus can be fabricated relatively inexpensively using semi-skilled labor.

It will be apparent that various modifications can be made in the particular solar energy apparatus described in detail above and shown in the drawings within the scope of the invention. For example, the size and configuration of the components can be changed to meet specific requirements. Also, the solar energy absorbing members can be disposed in various orientations provided the operation and functioning of the apparatus are not deleteriously affected. In addition, the solar energy absorbing material can be arranged differently in the absorbing members. Therefore, the scope of the invention is to be limited only by the following claims.

What is claimed is:

1. Apparatus for absorbing solar energy including a plurality of energy absorbing members, said energy absorbing members being arranged substantially parallel to and closely adjacent to each other in a row, each energy absorbing member having a generally cylindrical configuration and including a mass of solar energy absorbing material extending substantially to the edges thereof, said energy absorbing material being contained within a plurality of elongated tubes within said energy absorbing members, insulating material disposed on one side of said energy absorbing material, supporting means for said energy absorbing members including frame means providing a unitary assembly, sealing means disposed between adjacent energy absorbing members, said frame means including a housing, said housing including air circulating means associated with said energy absorbing members, means for interconnecting said energy absorbing members, means for moving said interconnected energy absorbing members in a coordinated manner from an energy absorbing position to an energy radiating position; whereby air flows through said housing and around said energy absorbing members.

2. Apparatus for absorbing solar energy according to claim 1 wherein said means for effecting movement includes an electrical motor.

3. Apparatus for absorbing solar energy according to claim 1 wherein said energy absorbing members are rotatable with respect to each other.

* * * * *